United States Patent [19]
Ito et al.

[11] Patent Number: 4,941,525
[45] Date of Patent: Jul. 17, 1990

[54] AUTOMOTIVE AIR CONDITIONER

[75] Inventors: Toshikazu Ito; Tsuneo Kagohata, both of Ibaraki, Japan

[73] Assignee: Hitachi, Ltd., Tokyo, Japan

[21] Appl. No.: 275,680

[22] Filed: Nov. 23, 1988

Related U.S. Application Data

[63] Continuation of Ser. No. 761, Jan. 6, 1987, abandoned.

[30] Foreign Application Priority Data

Jan. 10, 1986 [JP] Japan .................................. 61-2078

[51] Int. Cl.⁵ ............................................. F25B 29/00
[52] U.S. Cl. ........................................ 165/12; 165/16; 165/40; 165/42; 165/43; 236/49.3; 236/91 R; 236/91 G
[58] Field of Search ....................... 165/12, 16, 42, 43, 165/40; 237/12.3 A, 12.3 B, 2 A; 236/49.3, 91 R, 91 G

[56] References Cited

U.S. PATENT DOCUMENTS

| | | | |
|---|---|---|---|
| 4,325,426 | 4/1982 | Otsuka et al. | 165/43 |
| 4,456,166 | 6/1984 | Kagohata | 165/43 |
| 4,513,808 | 4/1985 | Ito et al. | 165/43 |

FOREIGN PATENT DOCUMENTS

| | | |
|---|---|---|
| 47-7845 | 9/1972 | Japan . |
| 57-3964 | 1/1982 | Japan . |
| 164418 | 9/1983 | Japan . |

*Primary Examiner*—John Ford
*Attorney, Agent, or Firm*—Antonelli, Terry & Wands

[57] ABSTRACT

An air mixing type automotive air-conditioner is disclosed in which an air fed by a blower is heated to a hot air by a hot water type heater, and a mixture ratio between a cold air flowing through a bypass passage around the heater and the hot air is adjusted by an air mixing door used as an adjustment damper. The air-conditioner comprises an outside temperature sensor for generating a first signal, a room temperature setter for generating a second signal, a room temperature sensor for generating a third signal, a first arithmetic unit for calculating a desired blown air temperature on the basis of the first and second signals, and a second arithmetic unit for calculating and controlling a desired blown air flow on the basis of the second and third signals. The air-conditioner is so controlled as to obtain the blown air temperature most suitable for a thermal load of the air-conditioner.

2 Claims, 7 Drawing Sheets

| TIMER COUNT | 112 |

PROCESS OUTPUT SIGNALS — 113

RETURN — 114

| | | |
|---|---|---|
| $M_0$ | ATMOSPHERE/VACUUM | ← THREE-WAY VALVE |
| $M_1$ | 20 | ← A/V 1 |
| $M_2$ | 0 | ← A/V 2 |
| $M_5$ | −15 | ← A/V 5 |
| $M_6$ | 8 | ← A/V 6 |
| $M_7$ | 0 | ← A/V 7 |

AUTOMOTIVE AIR CONDITIONER

This application is a continuation of application Ser. No. 000,761, filed on Jan. 6, 1987 now abandoned.

BACKGROUND OF THE INVENTION

The present invention relates to an automotive air-conditioner, and more particularly to an automotive air-conditioner equipped with a controller suitable for obtaining an outlet air at a desired temperature and a desired flow rate or amount.

An air mixture type automotive air-conditioner is well known in which air fed by means of a blower is heated by a hot water type heater and is mixed with cold air passing through a bypass passage arranged on a side of a core of the heater, and a mixture ratio therebetween is adjusted by means of an air mixing door, thus regulating or adjusting the temperature of the air blown off into a passenger room.

In such an air-conditioner, it is conventional to automatically control air flow by an opening degree of the air mixing door. For instance, this is shown in Japanese Unexamined Utility Model Publication No. 7845/72 and Japanese Unexamined Patent Publication No. 164418/83.

In the air-conditioner disclosed in the former publication, a position detector for the air mixing door is required for such purpose. As a result, it is necessary to carry out an adjustment of the position detector, which is troublesome.

On the other side, in the air-conditioner disclosed in the latter publication, such air-conditioner is controlled in accordance with a difference between a desired temperature and an actual passenger room temperature. Therefore, no position detector for the air mixing door is required, but heat quantity is controlled only in a fully or substantially fully closed position of the air mixing door.

SUMMARY OF THE INVENTION

An object of the present invention is to provide an automotive air-conditioner which is capable of controlling temperature of the blown air most suitable for a thermal load imposed on the air-conditioner.

To this end, according to the present invention, a suitable air temperature is set as a desired temperature of the air to be blown off on the basis of an ambient temperature, i.e. a thermal load and the air to be blown off are so controlled as to make the temperature thereof close to the desired temperature, thus obtaining a comfortable air temperature. Further, an air flow is controlled so that the temperature of the passenger room becomes a desired passenger room temperature, thus enabling a heat quantity control without any position detection.

DESCRIPTION OF THE PREFERRED EMBODIMENTS

Figure 1:
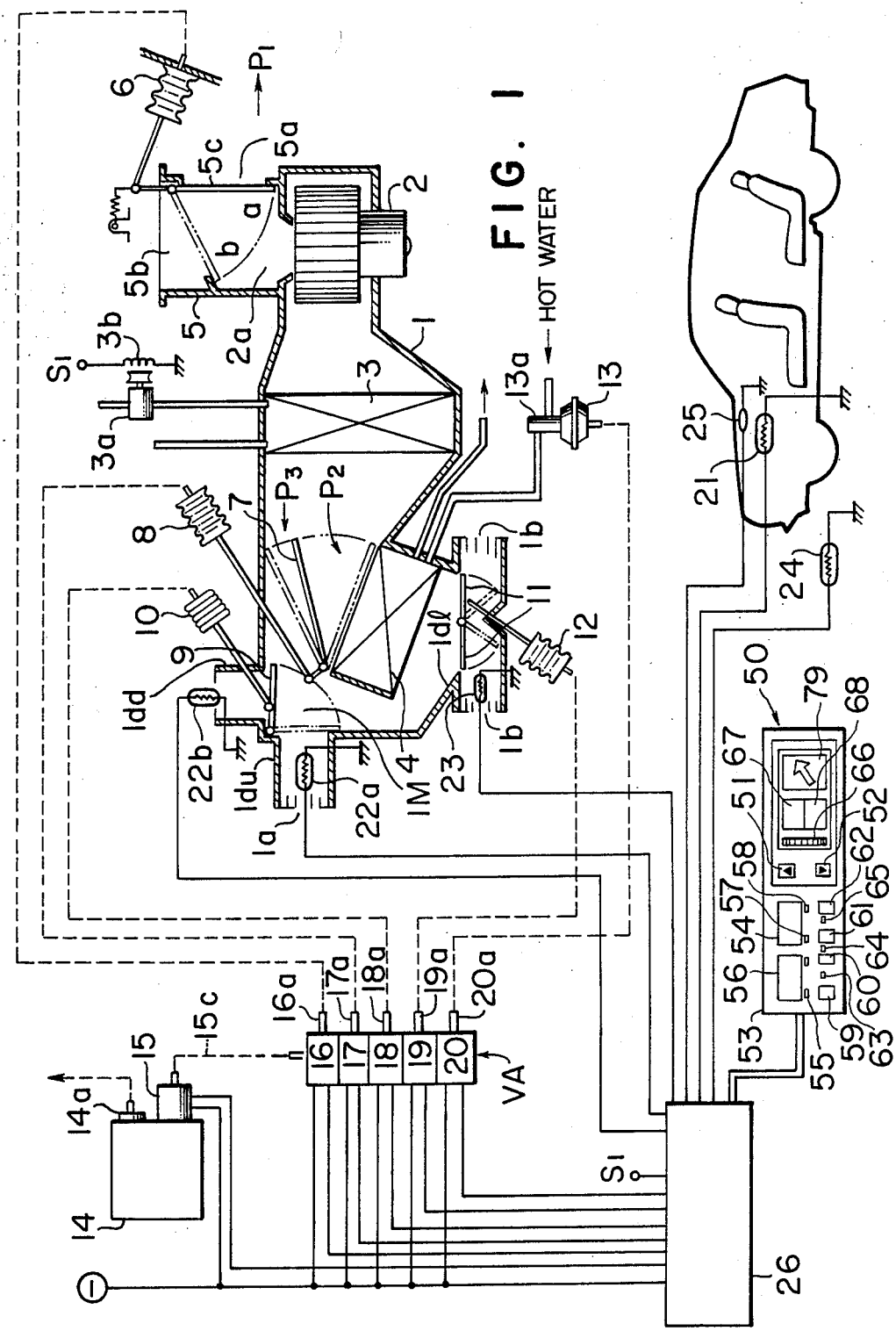
FIG. 1 is a schematic view showing an arrangement of an automotive air-conditioner in accordance with the present invention.

The present invention will now be described hereinunder by way of example with reference to the embodiment shown in FIG. 1. A casing 1 of an automotive air-conditioner mounted on an automobile incorporates therein a blower 2 disposed adjacent an inlet of the casing 1, an evaporator 3 and a heater core 4. An inside/outside switching-over duct 5 is provided upstream of an suction inlet $2a$ of the blower 2, which has an inside air suction inlet $5a$ communicating with a passenger room and an outside air suction inlet $5b$ communicating with an atmosphere. A switching door $5c$ which is to be actuated by a vacuum actuator 6 is swingably provided in the switching-over duct 5. The evaporator 3 is disposed downstream of the blower 2 so as to cool and dehumidify the air sucked into the casing 1 by means of the blower 2. The cooled air is heated by the heater core 4 disposed downstream of the evaporator 3. The heater core 4 circulates therethrough an engine cooling water as the heat source for such purpose. An air mixing door 7 is swingably provided in the casing 1 and associated with the heater core 4. The air mixing door 7 is so actuated by an actuator 8 as to control a ratio between a flow P2 of cooled air passing through the heater core 4 and a flow P3 of cooled air bypassing the heater core 4. Then the heat quantity is adjusted, which is to be added to the cooled air. The cooled air bypassing the heater core 4 and the heated air from the heater core 4 are introduced into an air mixing chamber 1M where they are mixed into a moderated air. The moderated air is blown out from the mixing chamber 1M to a vent $1a$ through an upper blow duct $1du$. A defroster duct $1dd$ is connected to the mixing chamber 1M to communicate it with a defroster for blowing the air towards a front glass of the automobile. A switching door 9 is swingably provided at a junction of the ducts $1du$ and $1dd$ so as to switch the moderated air flow directions, which is actuated by an actuator 10. A floor door 11 is provided in a lower blow duct $1dl$ and is centrally pivotably divided into two door elements. The floor door 11 is actuated by an actuator 12 to control the moderated air flows directed to the right and the left floor outlets $1b$, $1b$. A vacuum tank 14 is communicated at an inlet thereof with an intake manifold of an engine (not shown) through a check valve $14a$. An ON/OFF or electromagnetic valve 15 is provided at an outlet of the vacuum tank 14 so as to selectively output a vacuum or atmospheric pressure therefrom. For instance, the electromagnetic valve 15 may comprise a vacuum tank as shown in Japanese Examined Patent Publication No. 3964/82.

Figure 2:
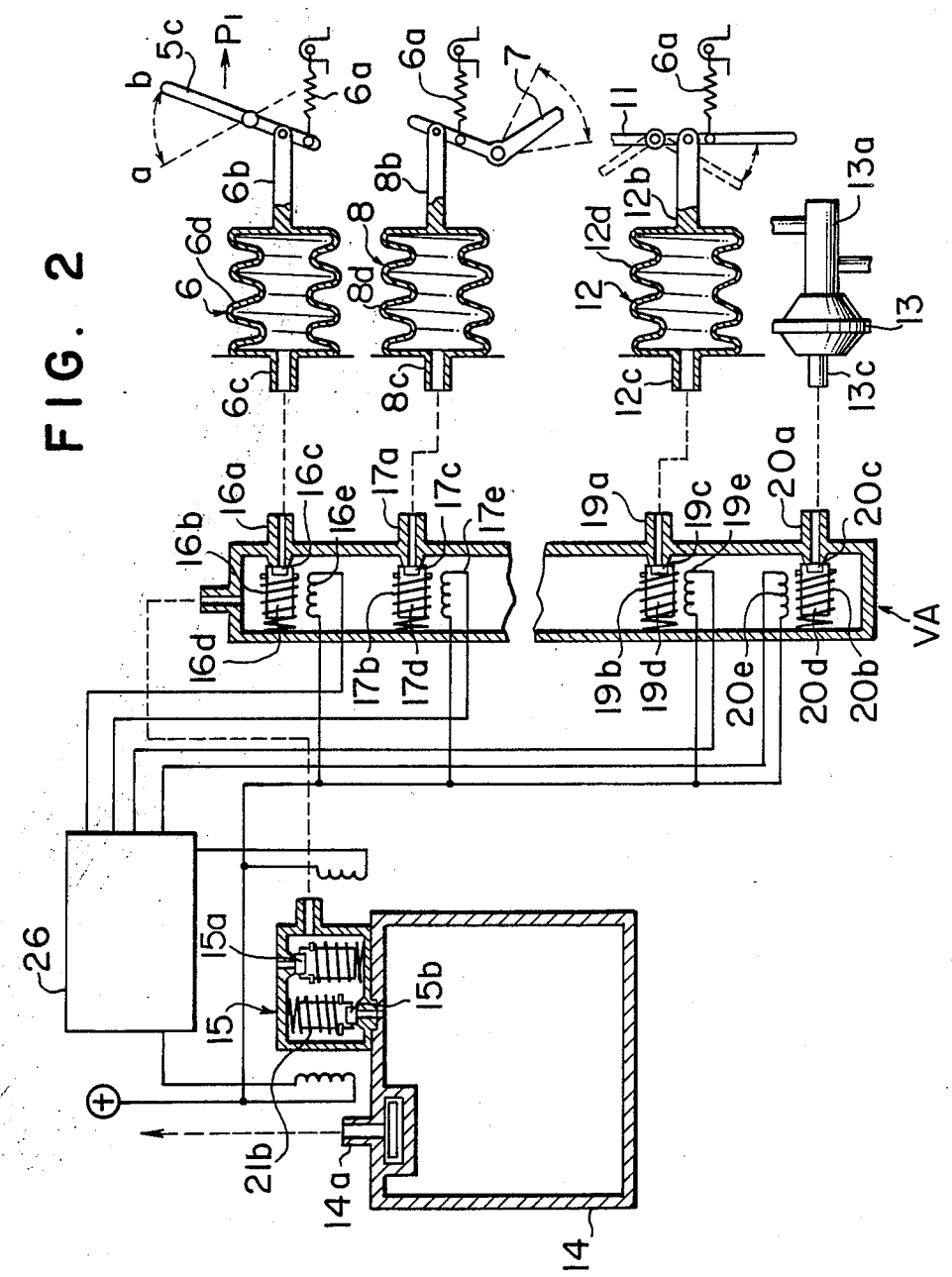
FIG. 2 is a circuit diagram for a vacuum controller used in the automotive air-conditioner shown in FIG. 1.

The output from the vacuum tank 14, i.e., the vacuum or the atmospheric pressure passing through the electromagnetic valve 15 is supplied through a tube $15c$ into a sealed valve assembly VA which includes five ON/OFF electromagnetic valves 16 to 20. As best shown in FIG. 2 in principle, the valve assembly VA is composed of valve members $16c$ to $20c$ each of which is biased by an associated spring $16b$ to $20b$ so as to normally close a corresponding output nipple $16a$ to $20a$ provided within the valve assembly VA, and of magnetic circuit means for retracting each valve member 16c to 20c against the force of the spring 16b to 20b so as to open the abovedescribed associated nipple 16a to 20a by the electromagnetic attractive force generated upon the supply of electric currents from the electric source to each electromagnetic coil 16e to 20e that electromagnetically acts on an associated magnetic core 16d to 20d carrying the valve number 16c to 20c. With such an arrangement, the output condition of the output nipple 16a to 20a of each valve 16 to 20 may be controlled in a desired manner. The actuator 6 causes the inside/outside door 5c to be controlled to be positioned between two positions a and b. The actuator 6 comprises a flexible pressure container 6d in a form of bellows. Either vacuum or atmospheric pressure is supplied from the output nipple 16a of the valve assembly VA through an input nipple 6c of the actuator 6 to the container 6d. The application of the vacuum pressure to the actuator 6 is controlled by the operation of the electromagnetic valve assembly VA in accordance with the output of the control circuit 26. A rod 6b of the actuator 6 is retained at the door 5c which is biased by a spring 6a in a direction indicated by the arrow P1 in FIGS. 1 and 2. When the atmospheric pressure is applied to the actuator 6, the rod 6b is moved in the leftward direction (in FIG. 1) by the spring 6a so that the door 5c is positioned at the position a. At this time, the outside air is introduced into the casing 1 of the air-conditioner by the blower 2. When, to the contrary, the vacuum pressure is applied through the nipples to the actuator 6, the rod 6b is moved in the rightward direction (in FIG. 1) against the force of the spring 6a, so that the door 5c is positioned at the position b. At this time, the internal air is introduced into the casing 1 of the air-conditioner by the blower 2. The introduced air is cooled and dehumidified during passing through the evaporator 3 if a compressor 3a is operated. Reference numeral 3b denotes a coil of an electromagnetic clutch for mechanically coupling and releasing the compressor and the engine in accordance with an output signal from the control circuit 26 through a terminal S1. The air passing through the evaporator 3 is introduced into the heater core 4 and/or the upper blow duct 1du through the bypass passage bypassing the heater core 4. The air mixing door 7 serves to control the ratio between the air flow to be passed through the heater core 4 and the air flow to be passed into the upper blow duct 1du and/or the lower blow duct 1dl through the bypass passage. The actuator 8 controls the opening degree of the air mixing door 7 in response to the vacuum or the atmospheric pressures applied from the output nipple 17a of the valve assembly VA on the basis of the output signal of the control circuit 26.

Figure 3:
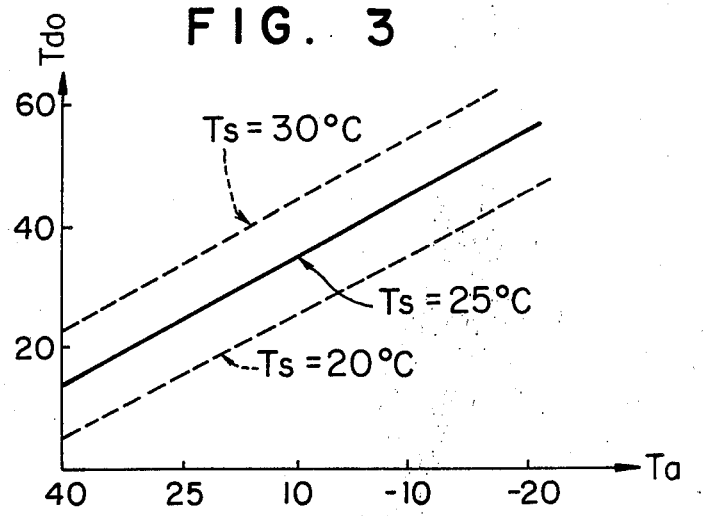
FIG. 3 is a graph showing characteristics of the desired temperature.
Figure 4:
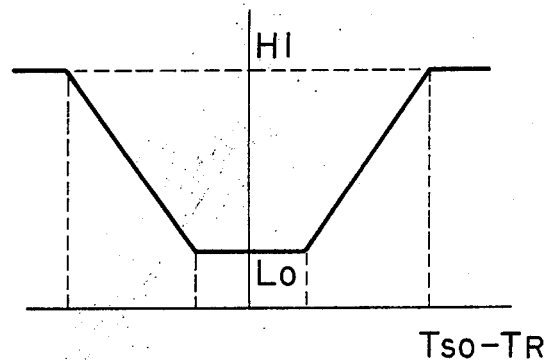
FIGS. 4, 5 and 11 are graphs showing operational characteristics of respective components of the air-conditioner.
Figure 5:
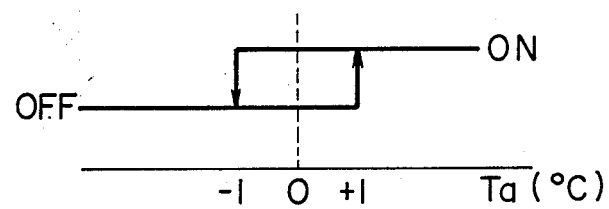

In the same way, the actuators 10 and 12, and an actuator 13 for a hot water valve 13a control the vent-defroster door 9, the floor door 11 and the hot water valve 13a, respectively in response to the vacuum or the atmospheric pressure supplied from the output nipples 18a and 19a, and an output nipple 20a, respectively. The hot water valve 13a may be a hot water cock. The control circuit 26 outputs control signals for determining the opening degree of the air mixing door 7, the ON/OFF conditions of the compressor 3a, the opening degree of the vent-defroster door 9, the opening degree of the floor door 11, the speed of the blower motor of the blower 2 and the like on the basis of the respective electric signals outputted from a passenger room temperature sensor 21, an ambient temperature sensor 24, an upper blow air temperature sensor 22a, a defroster blown air temperature sensor 22b, a floor blow air temperature sensor 23, a sunshine sensor 25, and temperature setters 51 and 52 provided on an operation panel 50 for the air-conditioner. On the operation panel 50, there are further provided two mode selectors (AUTO) 53 and 54. The mode selector (AUTO) 53 switches over an economy mode (ECON) in which the air condition is moderated without operation of the compressor and an air-conditioning mode (NC) in which the air condition is moderated with the operation of the compressor. The mode selector 54 switches over a demisting mode (DEMIST) and a defroster mode (DEF). These two mode selectors 53 and 54 consist of push buttons each of which is an alternative one so that two modes are alternated by every push operation. Indicators 55 to 58 indicate the selected modes. An OFF switch 59 is used for stopping the operation of the air-conditioner. During the operation of an LO mode selector 60, the blower speed is retained at a low level irrespective of the selection of the other modes. During the operation of an HI mode selector 61, the blower speed is retained at a predetermined high speed irrespective of the selection of the other modes. During the operation of a recirculation timer mode (REC) selector 63, the switching door 5c is switched over to an internal air recirculation irrespective of the selection of the other modes. Indicators 63 to 65 indicate the operational conditions of the blower speed mode (LO/HI) selector and the recirculation timer mode selector. A selected temperature changing indicator 66 indicates a change of the selected temperature in such a manner that the position of the scale projected by a lamp is raised and lowered step by step by every push operation of the temperature selectors 51 and 52. The selected temperature indicators 67 and 68 indicate the temperatures selected by the temperature selectors 51 and 52 in a digital fashion. The ambient temperature indicator 68 indicates the ambient temperature by reading out the output signal from the outside air temperature sensor 24 with the control circuit 26. A mode indicator 79 indicates the operational mode of the air-conditioner. It is important to note that the electromagnetic valve 15 and five ON/OFF electromagnetic valves 16 to 20 of the valve assembly VA are synchronously controlled in accordance with the outputs of the control circuit 26. In the electromagnetic valve 15, a valve element 15a is biased by a spring 21b to an atmospheric pressure introduction position when the electromagnetic valve 15 is not energized. Therefore, the atmospheric pressure is applied to the valve assembly VA. The coils 16e to 20e of the five ON/OFF valves 16 to 20 are not energized in a normal condition, so that the valve elements 16c to 20c are biased toward the nipples 16a to 20a. When the control circuit 26 judges that the vacuum pressure should be applied to some of the output nipples 16a to 20a, the control circuit 26 energizes the electromagnetic valve 15 and in order to energize the coil or coils 16e to 20e of the ON/OFF valves corresponding to the output nipples that needs the vacuum pressure, the control circuit 26 intermittently delivers the signals to them by the number of times calculated in the control circuit 26. As a result, during the energization of the coil, the valve elements 16c to 20c of the ON/OFF valve 16 to 20 corresponding to the intended nipple are retracted against the springs 16b to 20b, so that the vacuum pressure is intermittently applied to the output nipple 16a to 20a. Thus, the vacuum pressure is applied to the actuator that needs the vacuum pressure, in response to the intermittent numbers. As a result, the vacuum pressure causes the actuators to be retracted and/or changed, thus moving the door and the hot water valve to a desired positions. When the desired control is completed in a predetermined period of time, the electric supply to the ON/OFF valves are interrupted so that the output nipples corresponding to the working actuators are closed. In consequence, the interior of the actuator is kept under the pressure condition at this time, and the door or valve position is retained. Subsequently, the electric supply to the electromagnetic valve 15 is interrupted, so that the valve element 15a closes the vacuum introduction passage while opening the atmospheric pressure introduction passage, thereby supplying the air under the atmospheric pressure into the valve assembly VA through the tube 15c. In the case where it is judged that any one of the actuators should need the supply of the atmospheric pressure, the control circuit 26 confirms that the electromagnetic valve 15 is not energized and then the ON/OFF valve associated with such actuator is energized by the intermittent number given as the control signal to open the output nipple 16a to 20a and supply the atmospheric pressure to such actuator. Incidentally, in the case where the vacuum pressure is applied to some of the actuators 6, 8, 10, 12 and 13 and the other actuator needs the atmospheric pressure, the control circuit 26 judges the priority in control of the actuators. After the vacuum pressure supply to the former actuator is completed and the electromagnetic valve 15 is deenergized to keep the interior of the valve assembly at the atmospheric pressure, the ON/OFF valve corresponding to the output nipple of the latter actuator is energized to open such output nipple. Alternately, the control of the former actuator is interrupted, and the latter actuator is selected and controlled. Thus, after the transition of the air mixing door and the other mode doors to the normal condition, the electromagnetic valve 15 and the five ON/OFF valves can be free from the electric supply from the electric source until a change of the temperature control signals or the mode change requirement is generated. Therefore, electric power consumption may be reduced. It should be noted that the ON/OFF electromagnetic valves 16 to 20 are subjected to an electric supply for about 1/20 second each time, and each actuator 6, 8, 10, 12 and 13 is so constructed that the displacement of the actuator is at about 1/20 of the overall stroke thereof per one electric supply action. Therefore, if twenty electric supply actions are carried out, then each of the actuators is fully stroked. It takes about two seconds for every full stroke. Furthermore, the control circuit 26 is so constructed as to output signals for continuous electric supply or discontinuous electric supply, as desired. For example, in the case where the selected temperature is greatly changed, or in the case where a desired operational condition is obtained as soon as possible, as in a transient state of the temperature control such as the starting or initial stage of the air-conditioner, or as in a mode switching state for the defroster mode or the like, the control circuit may output the continuous or discontinuous operational signals. In this case, if the control mode of the electromagnetic valve 15 is in the former case, the vacuum pressure or atmospheric pressure is continuously applied to the actuator in accordance with either the continuous electric supply or discontinuous electric supply of the ON/OFF electromagnetic valve. Therefore, there is no inactive time and it is possible to shorten the time for the full stroke. It is appreciated that if the inactive time of the ON/OFF electromagnetic valve is at 1/20 second, it is possible to shorten a time for the full stroke of the actuator into about 1.0 second. With respect to the opening degree calculation of the air mixing door, when the temperatures are set by the temperature setters 51 and 52 on the operation panel, a desired passenger room temperature Tso is calculated in accordance with the following equation (1) programmed in an ROM of a microcomputer on the basis of the set temperature Ts, the detection temperature Ta of the outside air temperature sensor 24 and the amount Q of the sunshine detected by the sunshine sensor 25.

$$Tso = Ts - \alpha Ta - \frac{\beta}{600} Q \qquad (1)$$

where the unit of the desired temperature Tso and the outside temperature Ta is in °C., the coefficient $\alpha$ is the compensative constant for the set temperature Ts with respect to the outside temperature, and the coefficient $\beta$ is the compensative constant for the set temperature Ts with respect to the sunshine amount. The sunshine amount Q [Kcal/m²h] is represented by a value calculated in the terms of the heat quantity of 20 [Kcal/m²h] per one °C. of a difference between the detected temperature Ta of the sunshine sensor 25 and the detected temperature $T_R$ of the passenger room temperature sensor 21. The desired blow temperature is determined in accordance with the heat load, as shown in FIG. 3. A control signal by which the blow temperature Tdo or Td becomes the desired temperature is calculated, as the number of the operations of the valve 17 (i.e., the number of the electric supplies) is N, in accordance with the following equations:

$$\Delta Td = Tdo - Td \qquad (2)$$

$$\Delta Td = Tdo - Td \qquad (2)$$

$$N = k \left( \Delta Td + \frac{1}{A} \int \Delta Td \cdot dt \right) \qquad (3)$$

where, when $N \leq -20$, the minus N represents the vacuum continuous electric supply, whereas when $N \geq 20$, the N represents the atmospheric pressure continuous electric supply, and in case of the defroster mode, the N represents the atmospheric pressure continuous electric supply. For example, when the air mixing door 7 should be moved from the present position shown in FIG. 1 further to the full cooling side, the ON/OFF electromagnetic valve 17 is subjected to a predetermined number of electric supplies when the electromagnetic valve 15 outputs the vacuum pressure. A predetermined vacuum pressure is introduced into the actuator 8, so that the air mixing door 7 is moved to the full cooling side. Inversely, when the air mixing door 7 should be moved from the position shown in FIG. 1 to the full hot side, the ON/OFF electromagnetic valve is subjected to a predetermined number of electric supplies when the electromagnetic valve 15 outputs the atmospheric pressure. A predetermined atmospheric pressure is introduced into the actuator 8, so that the air mixing door 7 is moved to the full hot side. Thus, the temperature of the moderated air blown from the vent blow outlet 1a positioned on the side of the passenger's or driver's upper body and from the floor blow outlet 1b positioned on the floor side is controlled to a required temperature in correspondence with the set temperature (the desired temperature). In order that the passenger room temperature $T_R$ and the desired passenger room temperature Tso written into the RAM of the microcomputer meet the conditions shown in FIG. 3, a control signal for energizing the ON/OFF electromagnetic valve 16 is outputted from the control circuit 26 in accordance with the command signal from the microcomputer, thus controlling the inside/outside switching door 5c. Furthermore, in accordance with the output of the control circuit 26 on the basis of the command signal from the microcomputer, the voltage applied to the blower motor 2 is controlled in a manner shown in FIG. 4, thereby controlling the air flow of the blower motor 2. Also, in accordance with the output signal of the control circuit 26 on the basis of the command signal from the microcomputer, the drive/stop operation of the cooler (i.e., compressor) is controlled in a manner shown in FIG. 5.

Figure 6:
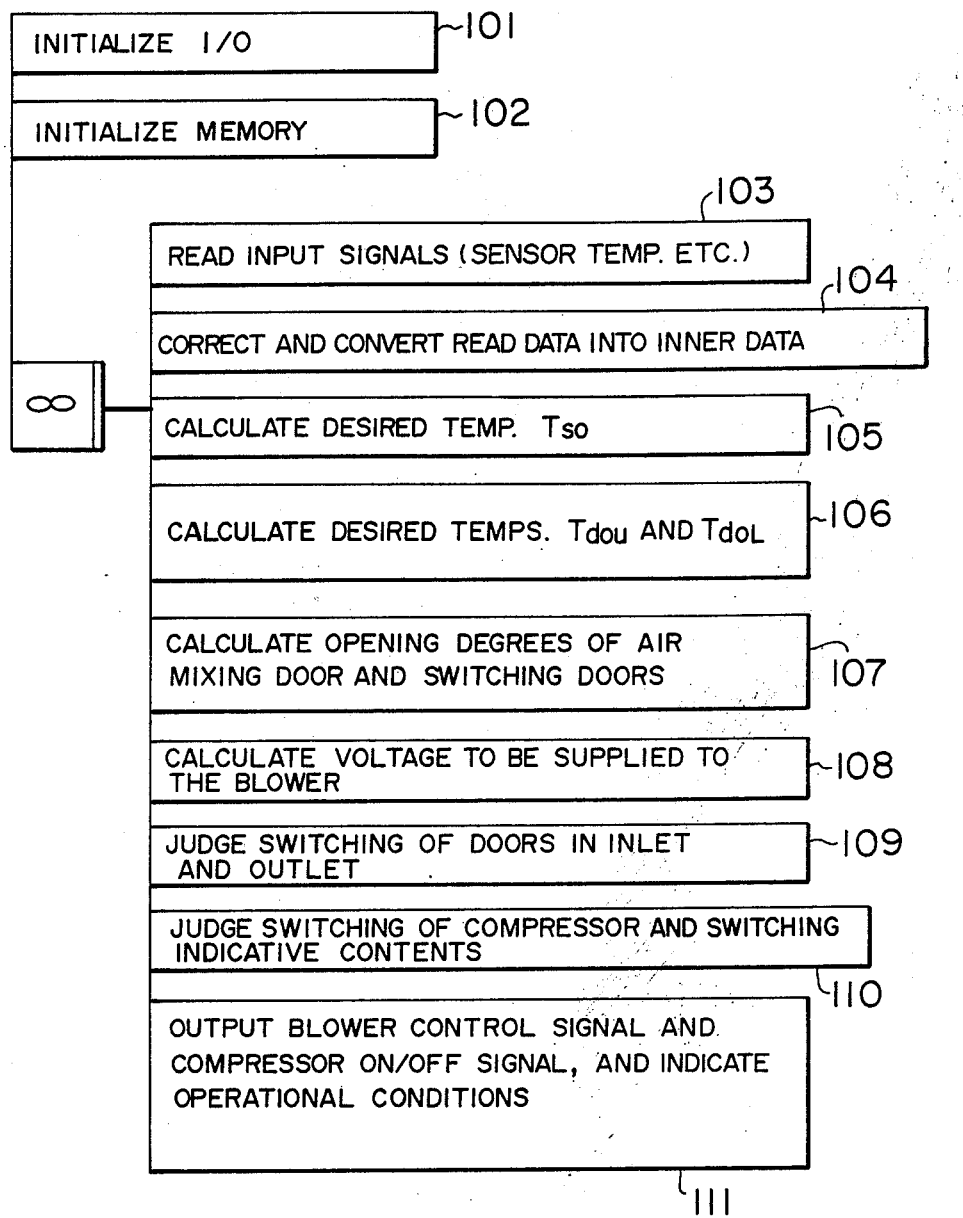
FIGS. 6 to 9 are illustrations and flowcharts of a microcomputer in accordance with the present invention.

A control flowchart of the microcomputer in accordance with the foregoing embodiment will now be described. To control the air-conditioner of the present invention, an embodiment of softwear will be explained in which the microcomputer is applied. FIG. 6 is a program analysis diagram (PAD) showing a flow of the main program which is composed of a I/O and a memory initializing routines 101 and 102 carried out once after resetting the microcomputer, and a control routine carried out repeatedly thereafter. When the electric supply is effected by the operation of the ignition key switch of the motor vehicle or the like operation, the microcomputer is reset so that the control is forcedly transferred to the initial step of the initializing routine. By the I/O initializing routine 101, the internal condition settings of the microcomputer per se or the signal conditions of the input/output terminals are set at predetermined conditions. Subsequently, by the memory initializing routine 102, the memories are set or cleared in response to a requirement of the internally stored data of the memory circuits. Since the preparations for carrying out the controls of the microcomputer have been conducted as thus far described, a series of calculation controls are repeatedly carried out in the control routine until the power supply is interrupted. A general operation of each block of the main control routine will now be described. First of all, in accordance with an input signal reading routine 103, input signals such as temperature signals or the like from the sensors and operational signals made by the passenger are read into the microcomputer. The operational signals from the passenger comprise the outside air temperature, the passenger room temperature, the blow outlet air temperature, the temperature at the portion immediately after the evaporator, the engine cooling water temperature, the vehicle speed signals or the like. These operational signals are converted through an A/D (analog/digital) converter and read into the microcomputer. A correction or compensation of a non-linear characteristic portion of the A/D converted data and a calibration of units are carried out by the correction and conversion routine 104. Subsequently, in a calculation routine 105, the passenger room temperature Tso which becomes the desired temperature is calculated. In the routine 105, the set temperature selected by the passenger is used as a basic level, and also, the outside temperature, the sunshine amount and the operational modes are taken into consideration, so that the set temperature set by the passenger is shifted or adjusted so as to keep a comfortable temperature in the space without any additional operation made by the passenger. Subsequently, in a calculation routine 106, the proportion and integral calculation is carried out on the basis of the desired temperature calculated in the foregoing step or the blow air temperature which has been read into the microcomputer and then the number N of the operation of the valve for keeping the comfortable temperature is calculated. As described above, the preparation of the temperature control has been carried out. However, since the operation of the air mixing door should be controlled on the basis of the time, the main program is transferred to a subsequent step after the above-described calculation, whereas some controls for the air mixing door opening degree or the like are to be carried out in a timer insertion routine to be described later. Subsequently, in the main program, a voltage to be supplied to the blower for determining the air flow thereof is calculated in accordance with the blower motor voltage calculation routine 108. In the routine 108, the air flow of the blower is set at a lower level when the set desired temperature Tso and the room temperature $T_R$ are substantially the same. As the difference therebetween is increased, the air flow is set at a higher level. Subsequently, in accordance with a door switching judgement routine 109 and a switching judgement routine 110 for the compressor/indication, the opening/closing of each switching door, the ON/OFF operation of the compressor and the like are determined by the passenger's selection and the comparison/judgement of the temperature conditions, and at the same time, the operationl conditions are indicated for the passenger on the monitoring indicator.

Figures 7, 8, 9:
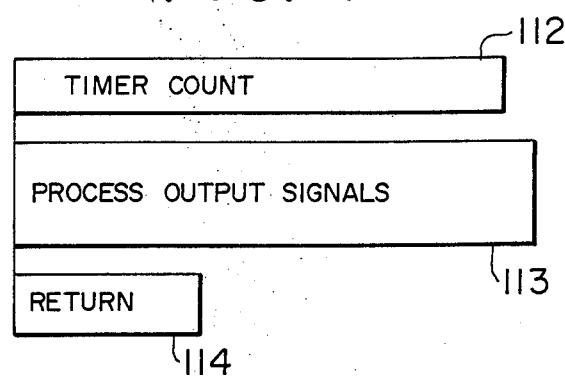

Finally, in accordance with a signal output routine 111, the output signals are actually fed from the microcomputer to the respective components or units to operate them with respect to the respective steps except for the steps that need controls on the basis of the time in the operations determined in the foregoing routines. Actually, in the above described control, the routines are repeatedly carried out at a very high speed, and the temperature control is carried out while the respective units immediately respond to the passenger's selection and the temperature changes in the respective parts. FIG. 7 is a PAD showing the flow of the above-mentioned timer insertion routine which is constructed so that the processing is forcedly transferred from the main routine to the timer insertion routine in every constant time by a hardware function of the microcomputer. Therefore, the processing after a constant time or the processing related to the time is carried out by using the timer insertion routine.

In FIG. 7, the measurement of the time is conducted by a timer counting routine 112. A time interval for transition to the timer insertion routine is, in general, several milliseconds. In order to make a long time range as in an operation conducted once a minute or an operation for stopping the output after ten minutes, a time counter is counted up whenever the processing is transferred to the timer insertion routine, thereby making a standard for being used in various controls related to the time. Subsequently, in accordance with an ON/OFF control routine 113 for the A/V (electromagnetic valve), the processing of the output signals of the steps that need controls related to the time, such as the air mixing door or the like will be carried out. In the control routine 113, the respective output signals are switched over in order in accordance with a lapse of time of the timer counter on the basis of the excessiveness or insufficiency of the opening degree of the air mixing door calculated in the main program. This step is often associated with the time sharing control and will be explained in more detail in conjunction with FIG. 8. Finally, in a return routine 114, the process is forcedly returned to the state before the processing is carried out, and the processing of the main program is continuously carried out.

An embodiment of software for a transient time sharing control in accordance with the present invention will now be described. In the operation of the time sharing control, as explained in conjunction with FIGS. 1 and 2, a two-way valve (ON/OFF valve) is provided for each actuator with respect to a single three-way valve coupled to the vacuum source, and each A/V (three- or two-way valves) is operated on a time basis, thereby supplying the vacuum pressure to each actuator. In carrying out the time sharing control, the following steps should be clarified on a software basis:

(1) To determine an operation needed for each actuator (as to if stop, atmospheric release or vacuum connection is needed.

(2) To determine a priority of each air valve in response to the determination (1) and time serially control each air valve in an ON/OFF manner.

With respect to the determination (1), this step has no direct relation to the time, and may be repeatedly calculated in the main program shown in FIG. 6. On the other hand, with respect to the above-described control (2), this control needs the time serial control of the time period in response to each controlled variable. Thus, the step (2) requires the processing in the timer insertion routine shown in FIG. 7. Therefore, means for transferring the calculation results in the main routine to the timer insertion routine is needed. In the following embodiment, this is carried out in such a manner that a part of the memory within the microcomputer is used as a flag. As shown in FIG. 8, in the case where the actuators ACT1 to ACT7 are controlled, there are required seven two-way valves (ON/OFF valves) in response to each actuator, and a single three-way valve coupled to the vacuum source. In this connection, eight flag regions M0 to M7 are set on the memory of the microcomputer as shown in FIG. 9. Each flag has a capacity of 8 bits and can represent values from $-129$ to $+128$. In function, the flag region M0 corresponds to the three-way valve connected to the vacuum source, and the flag regions M1 to M7 correspond, respectively, to A/V1 to A/V7. If the value of flag M0 is positive (including zero), the three-way valve is released to the atmosphere, whereas if the value of flag M0 is negative, the three-way valve is in communication with the vacuum pressure. The flag is judged and rewritten during the timer insertion routine. On the other hand, if the flags M1 to M7 become zero, the associated actuators are stopped. If positive values, they are released to the atmosphere. If negative values, they are in communication with the vacuum. The absolute values thereof represent the required controlled variables. Namely, if the content of the flag M1 is 20, the actuator ACT1 must be operated on the atmospheric release side corresponding to the amount of 20; and if the content of flag M5 is $-15$, the actuator ACT5 must be operated on the vacuum communication side corresponding to the amount of 15. The content of each flag is determined and written in the main program as described above, and the operation of each A/V is determined in consideration of the value of the flag in the timer insertion routine. In order to operate each actuator corresponding to the value of each flag, the following methods are effective:

(1) To determine the number of the on/off operation of each A/V according to the absolute value of each flag with the on/off operations of each air valve being repeated in a constant cycle.

(2) To control the ON time duration of each A/V according to the absolute value of each flag.

Figure 10:
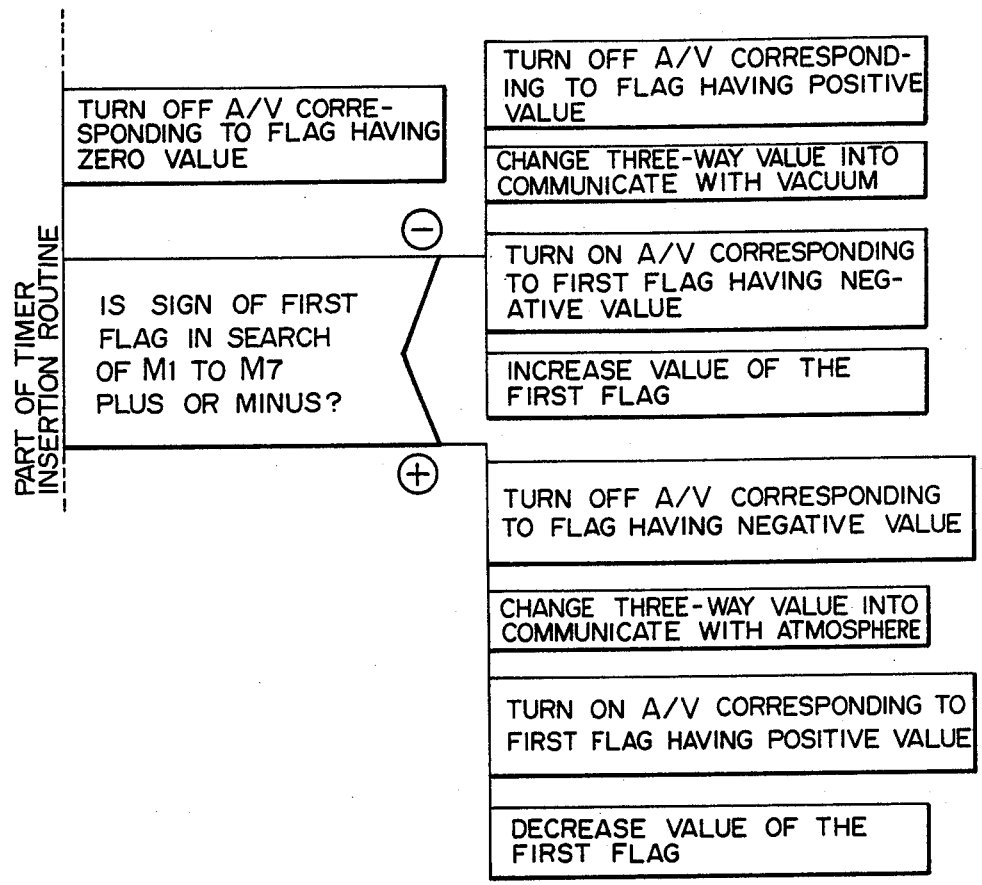
FIGS. 10 and 12 are illustrations of the operation of the air-conditioner in accordance with the present invention.

In the present invention, in view of the operational durability of the A/V and the reduction of the operational noise of the A/V, the method (2) described above is used. The method for carrying out the control on the basis of the priority order within the timer insertion routine will now be described in detail. It should also be noted that the embodiment shown in FIG. 1 may be controlled in either of the methods (1) and (2). FIG. 6 is a PAD showing the control program therefor. Actually, it is a routine to be incorporated into the air valve on/off control block in the timer insertion routine shown in FIG. 7. In a routine shown in FIG. 10, the routine is carried out in units of constant time (for example, every 10 milliseconds) by the hardware function. The flags M1 to M7 are checked in the first block. As a result, if the output representative of the value of the flag is at zero, the associated air valve is turned off to stop the actuator. Subsequently, the contents of the flags M1 to M7 are checked in order. As a result, the plus or minus sign of the flag Mx (x=1 to 7) which has a first value that is not zero is confirmed. If this sign is negative, the process proceeds into the block on the upper side of the PAD, the air valve is driven to introduce the vacuum pressure into the associated ACTx. More specifically, all the air valves that are released to the atmosphere (that correspond to the flags having the positive values) are turned off, thus stopping the operation of the release to the atmosphere. Subsequently, the three-way valve is switched over on the vacuum introduction side, and thereafter, the air valve A/Vx corresponding to the flag Mx checked before is actuated. By the forgoing operation, the vacuum pressure is applied to the ACTx through the air valve and the three-way valve, thus starting a necessary operation. On the program, in order to control the time period of the vacuum introduction, the content of the flag Mx is simultaneously increased by 1 (making the content close toward the zero), disabling the timer insertion routine. After 10 milliseconds, the process of the timer insertion routine is again started. If the content of the flag Mx checked immediately before is not zero, exactly the same operation is to be repeated. This is repeated in every 10 milliseconds until the content of the flag becomes zero. Namely, the vacuum pressure is applied into ACTx by the time period expressed by 10 milliseconds multiplied by the absolute value of the content of the flag Mx. If the content of the flag Mx becomes zero, in the next timer insertion routine, the content of the flag M(x+1) is to be checked. If the content of the flag M(x+1) is positive, the process proceeds into the block on the lower side of the PAD in FIG. 9, thus operating the flag M(x+1) to release to the atmosphere. The specific operations correspond vis-a-vis to the operations of the vacuum introduction as shown in the PAD. These operations are effected on each of the flags M1 to M7. Thus, unless the operation of the air valve corresponding to the M1 is completed, the operation corresponding to the flag M2 is not effected. As a result, the priority of the flag M1 is highest, and the priorities of the flags M2, M3, . . . are decreased. Incidentally, as described, the priorities are decreased from M1 to M7, and until the air valves having the higher priorities are stopped, the other air valves are not operated. However, the maximum continuous operating time period of each air valve (the value of the set flag) is limited below a constant value. By operating continuously the air valve until the flag becomes zero, the air valve may be turned on during a period proportional to the value of the set flag.

Although the embodiment of the timer insertion routine for embodying the time sharing control has been described, a specific operation of the main routine for calculating and determining the data of the flag to be transferred to the timer insertion routine will now be described. The calculation of the opening degree of the air mixing door will now be described with reference to FIG. 10, as an example of a component for controlling the opening degree thereof according to the blown temperature. This routine is included in the air mixing door opening degree calculation routine in the main program but is considerably different from the case of the control only the on/off condition of the vent-defroster door, floor door, hot water valve or the like in the following points that the actual blown temperature is actually detected and the actuator is controlled on the basis of a negative feedback signal. More specifically, the change in opening degree of the air mixing door is caused by the electric vacuum pressure and is completed in a relatively short time (less than 1 second), but in order to detect the actual temperature by means of the temperature sensor, it should take a long time from several seconds to ten-odd seconds. Therefore, the temperature signal generated during this period makes no sense as the feedback signal. Therefore, it is necessary to deal with the control signal during this period in a special manner. In order to solve this problem, in accordance with the embodiment of the present invention, after the opening degree control of the air mixing door is once effected, the air mixing door opening degree is fixed during a period of time $t_1$ which is sufficient for the blown temperature sensor to detect the temperature, and thereafter, the opening degree correction is newly calculated for the air mixing door on the basis of the temperature conditions in a repeated manner.

Figure 11:
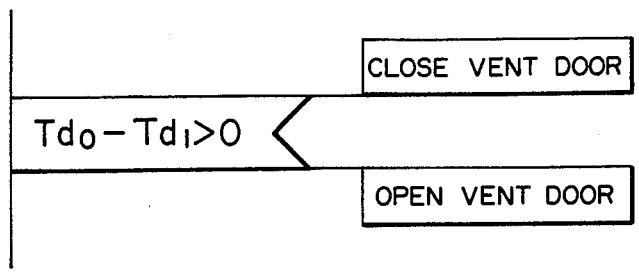

Referring to FIG. 9 showing the PAD, the software process will now be described. First of all, after the completion of the previous process for the air mixing door, it is judged whether time $t_1$ lapses. If the time $t_1$ has not yet lapsed, no process is effected on the air mixing door and the process proceeds to the next step. On the other hand, in the case where time $t_1$ has lapsed, the difference $\Delta t_{d0}$ between the desired blown temperature $T_{d0}$ calculated in the previous step in the main program and the actual blown temperature Td detected by the temperature sensor is calculated. In response to the result, the value is written in a position of the flag for transferring the data to the timer insertion routine. More specifically, in the case of $\Delta T_{d0}$, since the blown temperature should be increased, the value corresponding to $r \times \Delta T_{d0}$ is written as the value of the flag, where r is the constant that is experimentally determined on the basis of the correction amount of the opening degree of the air mixing door, required for correcting the temperature difference $\Delta T_{d0}$. On the other hand, with respect to $\Delta T_{d0}$, in the case where it is zero, the value of $r \times T_{d0}$ is written in the flag in the same manner, and in the case where $\Delta T_{d0}=0$, the value of zero is written in the flag, so that the subsequent air mixing door control process is automatically carried out by the timer insertion routine. Subsequently, referring to FIG. 11, the calculation of the opening degree of the vent door, i.e., switching damper 9 will now be described by way of example of a component for carrying out the control of only on/off operation in the main program in the same manner. This routine is included in the inlet and outlet door switching judgement routine in the main program. In the routine, the desired vent temperature $T_{d0}$ is compared with the predetermined temperature $T_{d1}$ (actually, set at about 30° to 35° C.). If $T_{d0} \leq T_{d1}$, the blown air temperature is a comfortable temperature less than the temperature of 30° to 35° C., so that the vent outlet is opened. Inversely, if $T_{d0} > T_{d1}$, the blown air temperature is too high and the passenger feels uncomfortable. Thus, in this case, the vent outlet is closed, the hot air is switched to be blown from the defroster outlet and the floor door 11 is opened to blow the hot air from the foot side. In the actual operation, in order to effectively actuate the time sharing operation, the value is written in the flag. Namely, in the case where $T_{d0} < T_{d1}$, it is judged whether or not the vent-defroster door is opened in the previous calculation result. In the case where the vent door is opened in the previous operation, the value of K2 that is small at about 1 to 2 is written in the flag. This is effective in correcting the vacuum pressure leakage or the like in the actuator during the time sharing control. On the other hand, if the previous calculation result shows the opened vent door, the value K3 is written in the flag, which corresponds to a time which is sufficient for the vent-defroster door 9 to angularly move from the fully closed position to the fully opened position. Thus, if the $T_{d0} > T_{d1}$ and the vent-defroster door 9 is closed, $-K2$ or $-K3$ is written as the value of the flag in the same manner. In the actual control process for the vent-defroster door, the process is automatically carried out in accordance with the timer insertion routine in the same manner as in the air mixing door. In the foregoing description, the explanation has been made as to the opening/closing calculation of the vent-defroster door and the opening degree calculation of the air mixing door. The calculation process for the other actuators in relation to the time sharing control may be carried out in the same manner. Although the blow outlet temperature control and the blow amount control in accordance with the present invention have been explained, in the case of the initial operation of the air conditioner or in the case where the set temperature should be largely changed, it is more suitable for the passenger's feeling to control the components in an overshoot manner by decreasing or increasing the blow outlet temperature exceeding the target temperature. This makes it possible to more quickly change the room temperature to the target temperature. In order to attain this, in the case where there is a large difference between the desired room temperature and the actual room temperature, the desired blown temperature is calculated for control in accordance with the difference $\Delta TR$ therebetween. More specifically, the temperature Tso is given by the foregoing equation (1) and the blow temperature is controlled in accordance with the following calculation:

$$\Delta TR = T_{so} - TR \quad (4)$$

$$T_{d0} = \delta\left(\Delta TR + \frac{1}{B}\int \Delta TR \cdot dt\right) \quad (5)$$

$$\Delta T_{d0} = Tdo - Td \quad (2)$$

$$N = k\left(\Delta Td + \frac{1}{A}\int \Delta Td \cdot dt\right) \quad (3)$$

Figure 12:
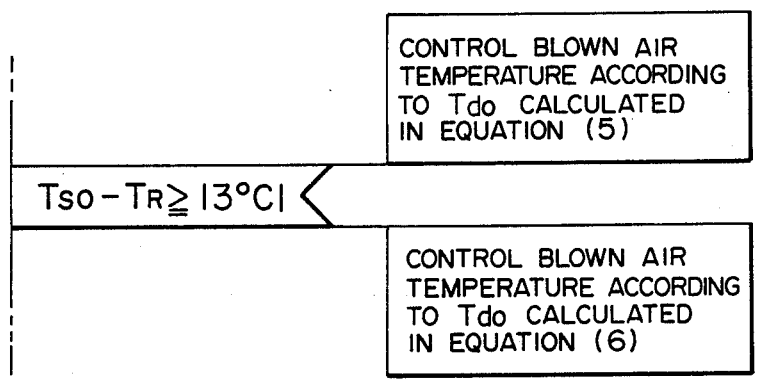

FIG. 12 shows a flowchart for determining whether the desired blown air temperature is calculated on the basis of the difference between the desired room temperature and the room temperature or whether the desired temperature is calculated on the basis of the thermal load imposed on the air-conditioner.

Also, FIG. 3 shows an example of the desired blown air temperature with respect to the thermal load, showing the selection method of the specific desired blown air temperature.

FIG. 3 shows the relation expressed by the equation:

$$Td0 = XTA\ 30\ Y \quad (6)$$

where X is the correction constant of the outside temperature TA and Y is the correction constant for the temperature Ts, the sunshine amount and so on.

According to the present invention, the following advantages may be enjoyed.

(1) A comfortable room temperature and a comfortable blow temperature may be obtained.

(2) Since the main control for the air-condition is conducted by the blown air temperature control, the system may provide a quick response and ensure a stable air conditioning.

(3) It is possible to control the heat quantity (blow air temperature × flow rate) without detecting the opening degree of the air mixing door. The detector for detecting the position of the air mixing door may be dispensed with, which may provide a low cost automotive air-conditioner.

We claim:

1. An air-conditioner mounted on a vehicle comprising:
    a blower means for delivering air into a passenger room;
    a heater core through which hot water circulates to heat the air from said blower means;
    an air mixing door disposed for adjusting a mixture ratio between cold air flowing in a bypass passage bypassing said heater core, and hot air to be directed to said heater core;
    an outside temperature sensor for generating a first signal in response to the outside temperature;
    a passenger room temperature setter for generating a second signal in response to a set passenger room temperature;
    a passenger room temperature sensor for generating a third signal in response to a passenger room temperature;
    a fourth signal generating means for generating a fourth signal representative of a desired passenger room temperature in response to at least said second signal;
    a first arithmetic means for calculating a desired blown air temperature under a calculation model programmed in a ROM of a microcomputer on the basis of only said first and said second signals;
    a second arithmetic means for calculating a desired blow air flow of said blower means on the basis of said second and said third signals; and
    means for controlling operation and non-operation of a compressor operatively associated with an evaporator upstream of the heater core on the basis of ambient temperature;
    means for adjusting a blown air temperature on the basis of a difference between said fourth signal and said third signal when said difference equals or exceeds an absolute predetermined value, and for selecting, when such difference is below said absolute predetermined value, a blown air temperature obtained in advance on the basis of a thermal load of the passenger room, in accordance with arithmetic results of said first arithmetic means, and means for adjusting a blow air flow on the basis of said second arithmetic means.

2. An air-conditioner mounted on a vehicle comprising:
    a blower means for delivering air into a passenger room;
    a heater core through which hot water circulates to heat the air from said blower means;
    an air mixing door disposed for adjusting a mixture ratio between cold air flowing in a bypass passage bypassing said heater core, and hot air to be directed to said heater core;
    an outside temperature sensor for generating a first signal in response to the outside temperature;
    a passenger room temperature setter for generating a second signal in response to a set passenger room temperature;
    a passenger room temperature sensor for generating a third signal in response to a passenger room temperature;
    a fourth signal generating means for generating a fourth signal representative of a desired passenger room temperature in response to at least said second signal;
    a first arithmetic means for calculating a desired blown air temperature in accordance with a ROM microcomputer program on the basis of only said first and said second signals;
    a second arithmetic means for calculating a desired blow air flow of said blower means on the basis of said second and said third signals; and
    means for controlling operations and non-operations of a compressor operatively associated with an evaporator upstream of the heater core on the basis of ambient temperature;
    means for adjusting a blown air temperature on the basis of a difference between said fourth signal and said third signal when said difference exceeds an absolute predetermined value, and for selecting, when such difference is below said absolute predetermined value, a blown air temperature obtained in advance on the basis of a thermal load of the passenger room, in accordance with arithmetic results of said first arithmetic means, and means for adjusting a blow air flow on the basis of said second arithmetic means.

* * * * *